US012723611B2

(12) United States Patent
Chiu et al.

(10) Patent No.: US 12,723,611 B2
(45) Date of Patent: Sep. 1, 2026

(54) EMBEDDING STRUCTURE AND EMBEDDING ASSEMBLY

(71) Applicant: Wistron NeWeb Corporation, Hsinchu (TW)

(72) Inventors: Yu-Kai Chiu, Hsinchu (TW); Chang Yu Huang, Hsinchu (TW)

(73) Assignee: WISTRON NEWEB CORPORATION, Hsinchu (TW)

( * ) Notice: Subject to any disclaimer, the term of this patent is extended or adjusted under 35 U.S.C. 154(b) by 41 days.

(21) Appl. No.: 18/768,177

(22) Filed: Jul. 10, 2024

(65) Prior Publication Data

US 2025/0188969 A1 Jun. 12, 2025

(30) Foreign Application Priority Data

Dec. 8, 2023 (TW) ................................ 112147782

(51) Int. Cl.
*F16B 7/22* (2006.01)

(52) U.S. Cl.
CPC ..................................... *F16B 7/22* (2013.01)

(58) Field of Classification Search
CPC .......... F16B 7/22; F16B 5/0664; F16B 21/06; F16B 21/086
See application file for complete search history.

(56) References Cited

U.S. PATENT DOCUMENTS 4,150,464 A * 4/1979 Tracy .................. A44B 11/266 24/615
5,419,020 A * 5/1995 Murai .................. A44B 11/266 24/633
6,154,936 A * 12/2000 Howell .............. A44B 11/2592 24/615
9,032,767 B2 * 5/2015 Takahashi .......... A44B 11/2573 70/58
9,585,441 B2 * 3/2017 Kaneko ................ A44B 11/266
10,617,180 B1 * 4/2020 Yen ........................ A44B 11/06
11,219,280 B2 * 1/2022 Heinemark ........ A44B 11/2592
2006/0053600 A1 3/2006 Liu
2010/0107370 A1 * 5/2010 Paik .................... A44B 11/266 24/190
2014/0345096 A1 * 11/2014 Lee .................... A44B 11/2592 24/625

(Continued)

FOREIGN PATENT DOCUMENTS

| | | |
|---|---|---|
| CN | 207297567 U | 5/2018 |
| WO | 2005013750 A1 | 2/2005 |
| WO | 2007138634 A2 | 12/2007 |

*Primary Examiner* — David M Upchurch
(74) *Attorney, Agent, or Firm* — McClure, Qualey & Rodack, LLP

(57) ABSTRACT

An embedding assembly is proposed. The embedding assembly includes a socket and an embedding structure. The embedding structure is detachably connected to the socket and includes a body, two hooks and two restricting parts. The two hooks are respectively disposed on one end of the body and extend in a direction from the body. The two restricting parts are respectively connected to two sides of the body and extend in the direction. A space is formed between the two restricting parts and the body respectively. When the embedding structure is connected to the socket, the two hooks pass through the socket and buckle with one end of the socket, and the other end of the socket is embedded in the space.

19 Claims, 10 Drawing Sheets

(56) References Cited

U.S. PATENT DOCUMENTS

| | | | | |
|---|---|---|---|---|
| 2018/0058484 | A1* | 3/2018 | Marshman | F16B 5/065 |
| 2019/0136894 | A1* | 5/2019 | Leidig | F16B 21/086 |
| 2019/0186524 | A1* | 6/2019 | Roy | F16B 37/044 |
| 2020/0339045 | A1* | 10/2020 | Dickinson | F16B 21/075 |
| 2020/0361400 | A1* | 11/2020 | Loyola | B60R 13/02 |
| 2020/0392973 | A1* | 12/2020 | Ammann | F16B 5/0642 |
| 2023/0220860 | A1* | 7/2023 | Dickinson | F16B 21/075 24/297 |
| 2023/0339413 | A1* | 10/2023 | Barrera | B60R 13/0243 |

* cited by examiner

EMBEDDING STRUCTURE AND EMBEDDING ASSEMBLY

RELATED APPLICATIONS

This application claims the benefit of priority to Taiwan Patent Application No. 112147782, filed on Dec. 8, 2023. The entire content of the above identified application is incorporated herein by reference.

BACKGROUND

Technical Field

The present disclosure relates to an embedding structure and an embedding assembly.

Description of Related Art

In general, if two structures need to be connected and fixed, when the product falls or vibrates, embedding failure problems, such as shaking and separation, disengagement, or fracture between the two structures, are prone to occur.

In addition, when the above two structures are connected and fixed, they are usually assembled through fixing methods that are not conducive to sustainable recycling, such as screws, backing adhesive, adhesive, or curing glue. The fixing methods mentioned above are costly and difficult to assemble and disassemble. They are not conducive to recycling and do not meet the goal of green product design.

Given this, there is currently a lack of an embedding structure that can be tightly combined, easily disassembled, and has good recyclability, so relevant industry players are looking for a solution.

SUMMARY

An embedding structure is provided according to one embodiment of the present disclosure. The embedding structure includes a body, two hooks, and two restricting parts. The two hooks are disposed on one end of the body and extend in a direction from the body. The two restricting parts are respectively connected to two sides of the body and extend in the direction, and a space is formed between the two restricting parts and the body respectively.

An embedding assembly is provided according to another embodiment of the present disclosure. The embedding assembly includes a socket and an embedding structure. The embedding structure is detachably connected to the socket and includes a body, two hooks, and two restricting parts. The two hooks are disposed on one end of the body and extend in a direction from the body. The two restricting parts are respectively connected to the two sides of the body and extend in the direction and a space is formed between the two restricting parts and the body respectively. When the embedding structure is connected to the socket, the socket is configured for the two hooks to pass through and buckle with one end of the socket, and another end of the socket is embedded in the space.

BRIEF DESCRIPTION OF THE DRAWINGS

The described embodiments may be better understood by reference to the following description and the accompanying drawings, in which.

DETAILED DESCRIPTION

Figure 1:
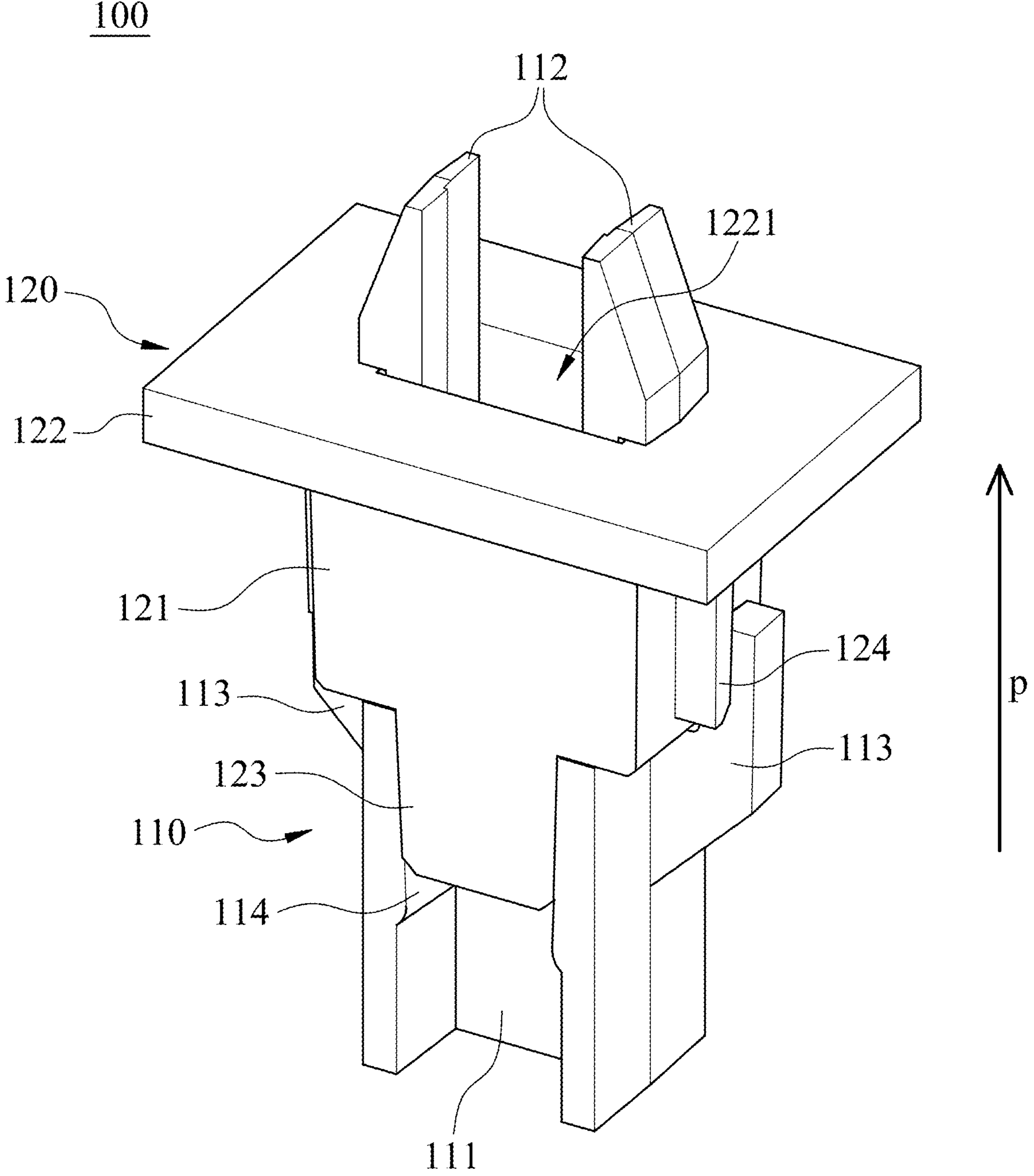
FIG. 1 is a three-dimensional schematic view of an embedding assembly according to an embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of “a”, “an” and “the” includes plural reference, and the meaning of “in” includes “in” and “on”. Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as “first”, “second” or “third” can be used to describe various components, signals or the like, which are for distinguishing one component/signal from another one only, and are not intended to, nor should be construed to impose any substantive limitations on the components, signals or the like.

Figure 2:
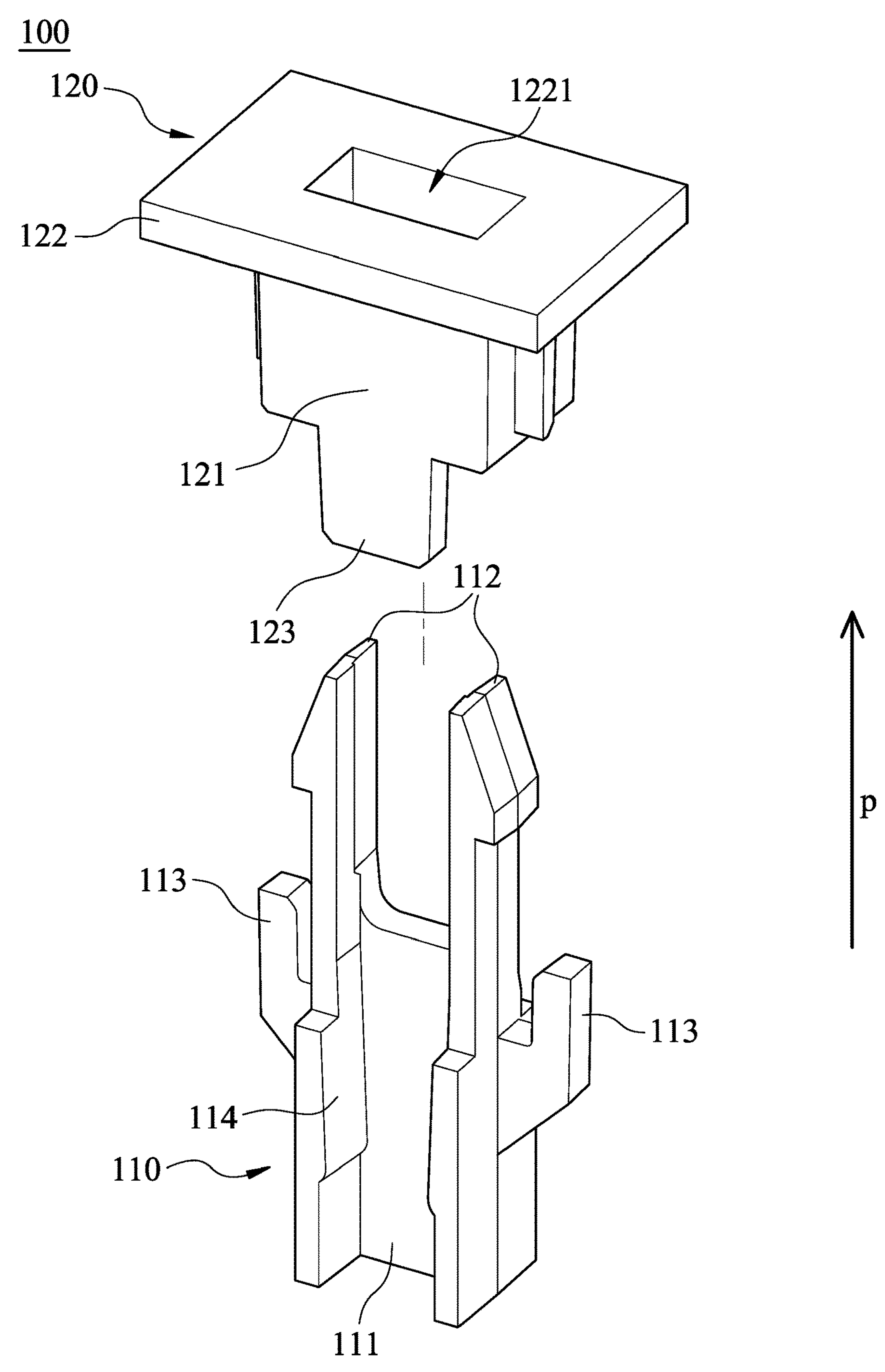
FIG. 2 is an exploded view of the embedding assembly according to the embodiment of FIG. 1.
Figure 3:
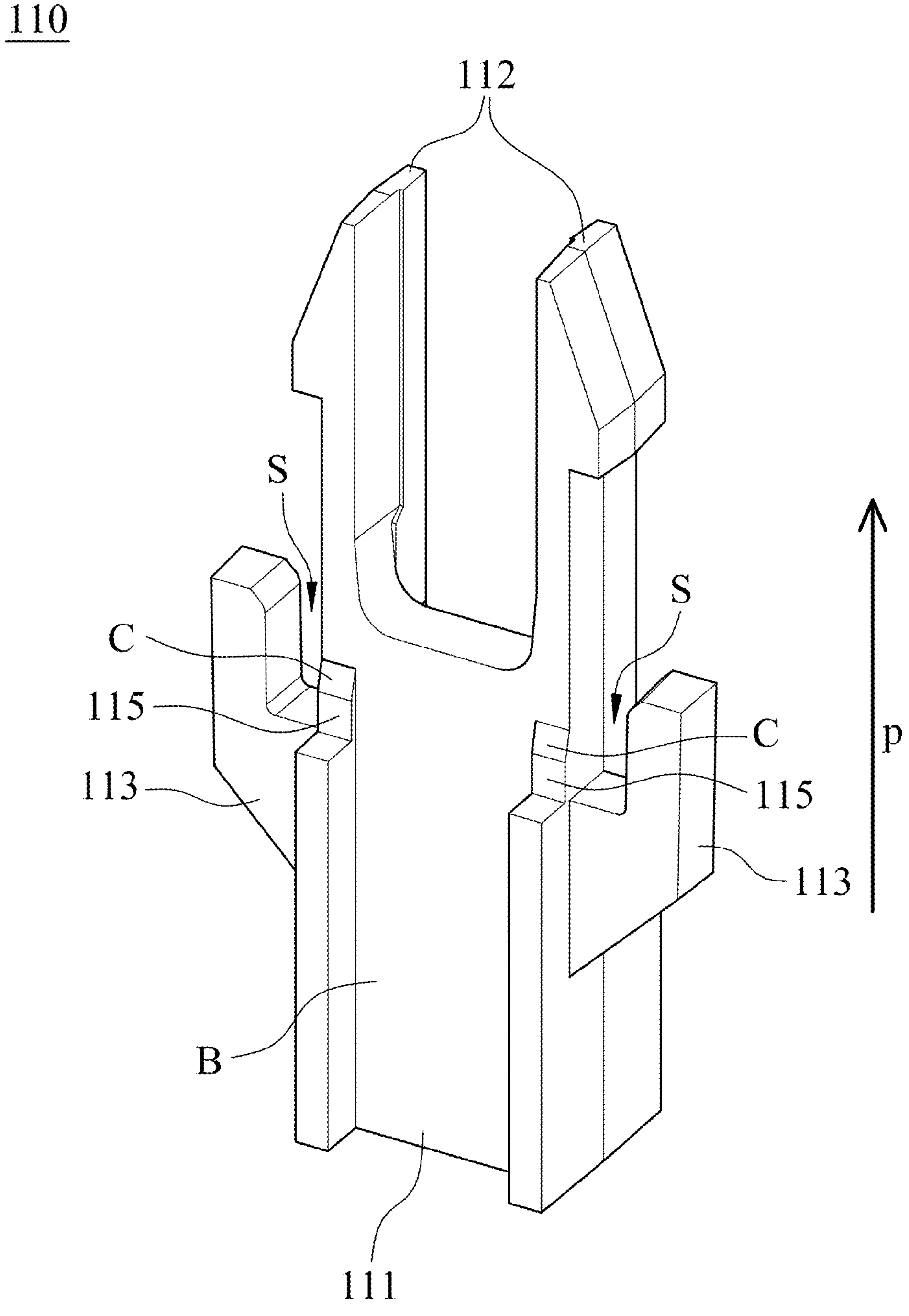
FIG. 3 is a three-dimensional schematic view of an embedding structure according to the embodiment of FIG. 1.
Figure 4:
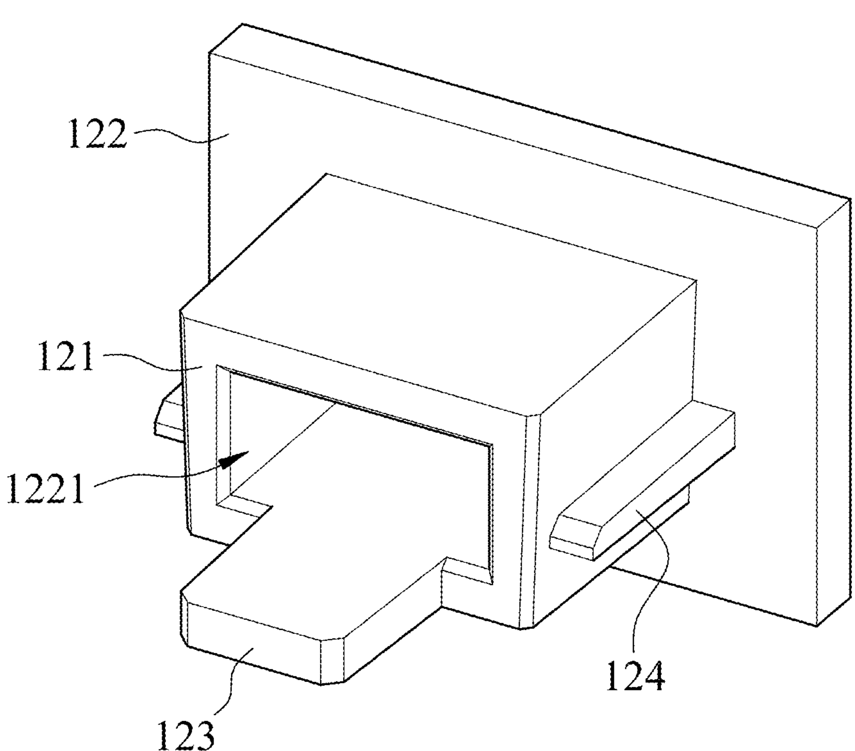
FIG. 4 is a three-dimensional schematic view of a socket according to the embodiment of FIG. 1.

Referring to FIG. 1 to FIG. 4. FIG. 1 is a three-dimensional schematic view of an embedding assembly 100 according to an embodiment of the present disclosure. FIG. 2 is an exploded view of the embedding assembly 100 according to the embodiment of FIG. 1. FIG. 3 is a three-dimensional schematic view of an embedding structure 110 according to the embodiment of FIG. 1. FIG. 4 is a three-dimensional schematic view of a socket 120 according to the embodiment of FIG. 1. The embedding assembly 100 includes an embedding structure 110 and a socket 120. The embedding structure 110 is detachably connected to the socket 120 in one direction p. As shown in FIG. 1, when the embedding structure 110 is connected to the socket 120, the socket 120 is configured for the embedding structure 110 to pass through and buckle with one end of the socket 120. In the embodiment of FIG. 1, the embedding structure 110 and the socket 120 are integrally formed respectively.

Figure 5:
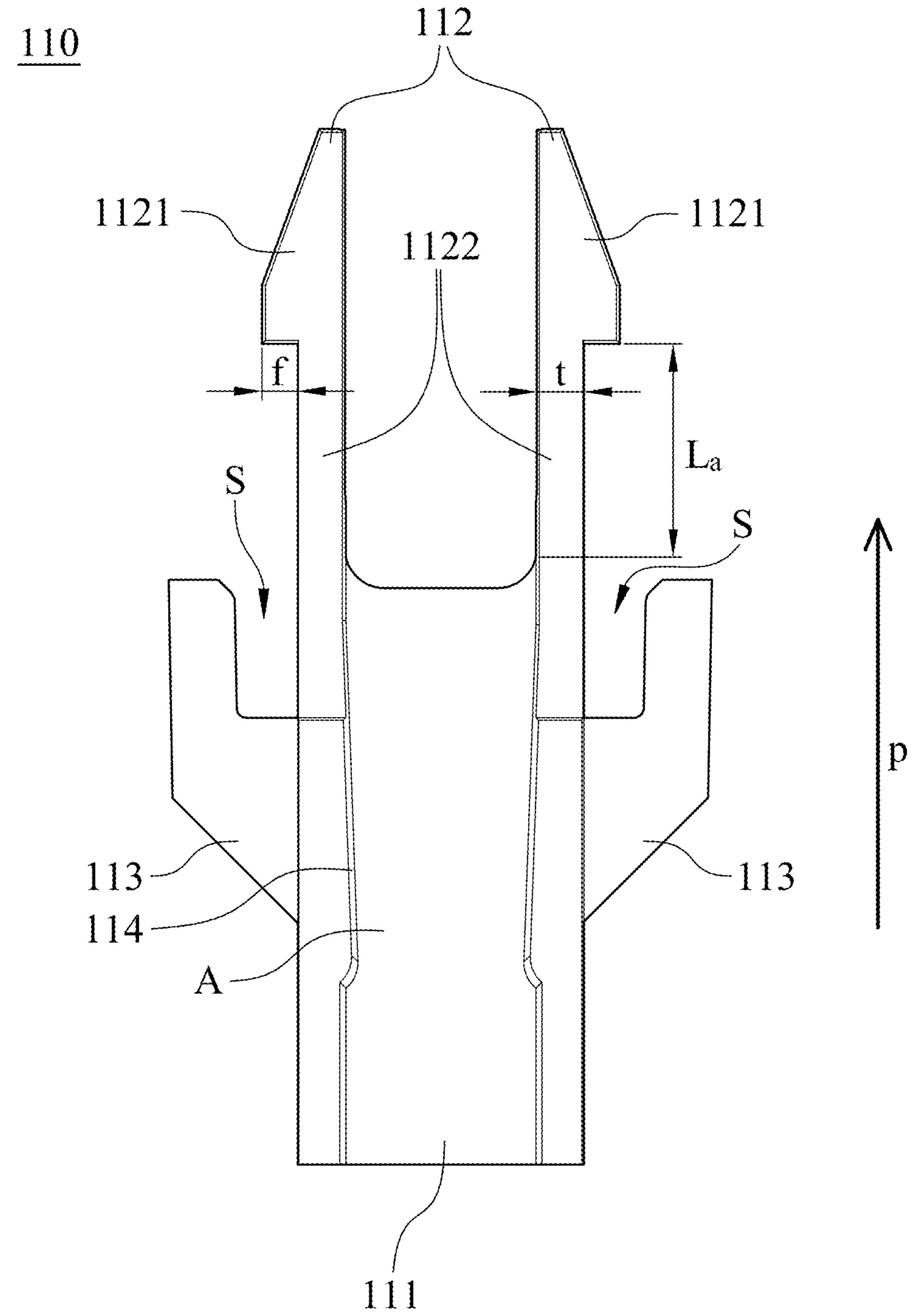
FIG. 5 is a front view of the embedding structure according to the embodiment of FIG. 3.

Referring to FIG. 1, FIG. 3, and FIG. 5. FIG. 5 is a front view of the embedding structure according to the embodiment of FIG. 3. The embedding structure 110 includes a body 111, two hooks 112, and two restricting parts 113. The hooks 112 are respectively disposed on one end of the body 111 and extend from the body 111 in the direction p. The restricting parts 113 are respectively connected to two sides of the body 111 and extend in the direction p. The restricting part 113 is in an L-shape, and a space S is between the restricting part 113 and the body 111. The hook 112 is configured to buckle the socket 120, and the restricting part 113 is configured to prevent the hook 112 from falling off from the socket 120 due to factors of external force such as bending or shaking when the hook 112 is buckled with the socket 120. When the embedding structure 110 is connected to the socket 120, one end of the socket 120 is configured for the hook 112 to pass through and buckle. Another end of the socket 120 is embedded in the space S.

Referring to FIG. 1, FIG. 2, and FIG. 4. The socket 120 includes a tank 121 and a plate 122. The plate 122 is connected to the tank 121. The plate 122 includes an opening 1221, and the opening 1221 is communicated with the tank 121. When the embedding structure 110 is connected to the socket 120, the hook 112 passes through the tank 121 and the opening 1221, and is buckled with the plate 122. The tank 121 is embedded in the space S.

Therefore, by the way that the embedding structure 110 is buckled through the hook 112, the socket 120 can be stably and effectively connected without the use of any fixing components (e.g., screws, backing adhesive, adhesive, or curing glue), it is also easy for users to disassemble and recycle, and meets the green design goal.

Referring to FIG. 5. The hook 112 includes a hooking portion 1121 and an elastic arm 1122. The elastic arm 1122 is connected to the hooking portion 1121 and the body 111. The hooking portion 1121 has a hook length f, and the elastic arm 1122 has an arm length La and an arm thickness t. The ratio of the hook length f to the arm length La (f/La) is between 0.05 and 0.30. The ratio of the arm length La to the arm thickness t is a width-length ratio (La/t), which is between 3.00 and 8.00.

Figure 6:
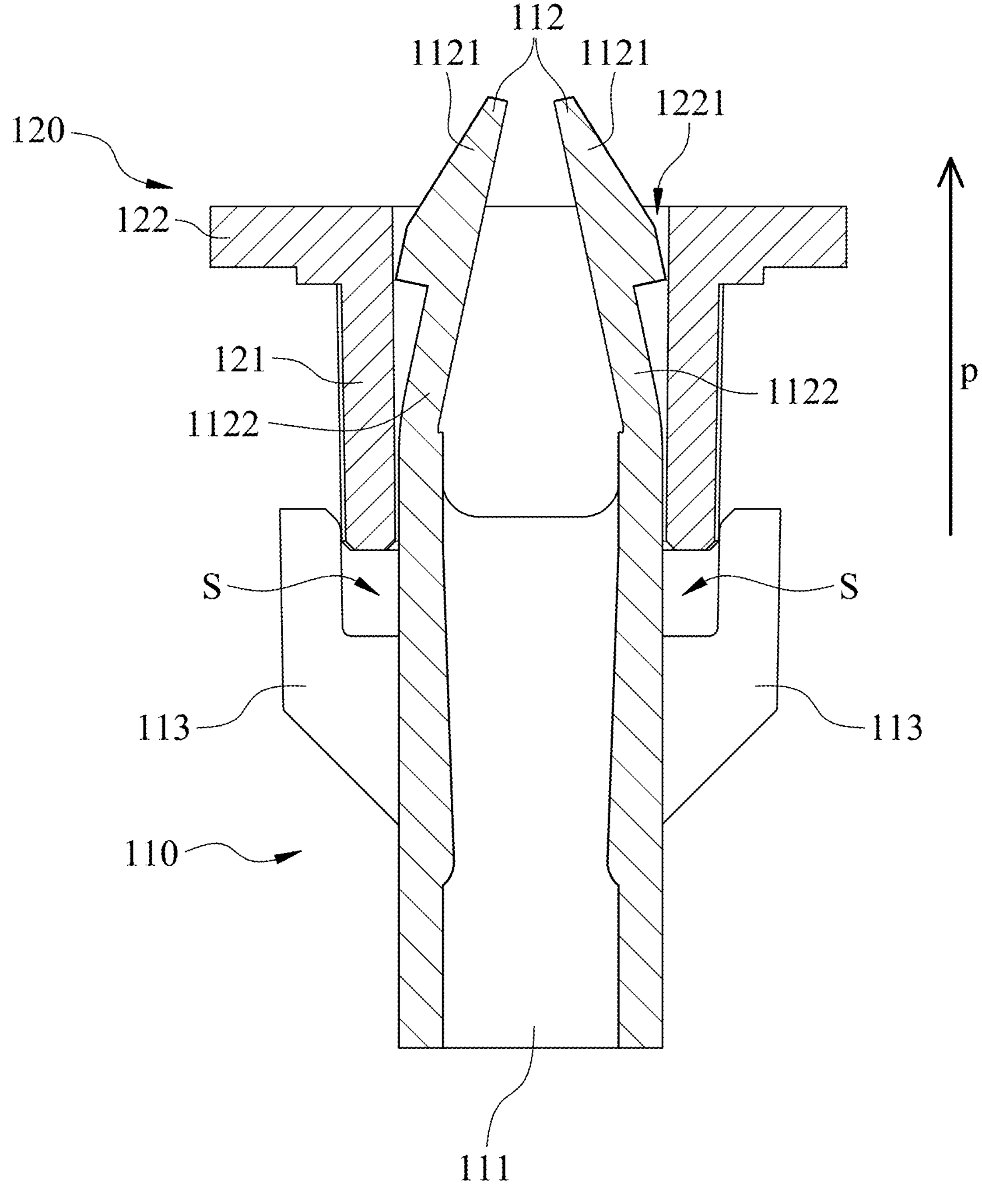
FIG. 6 is a schematic assembly view of the embedding structure and the socket according to the embodiment of FIG. 1.

Specifically, referring to FIG. 5 and FIG. 6, FIG. 6 is a schematic assembly view of the embedding structure 110 and the socket 120 according to the embodiment of FIG. 1. When the embedding structure 110 is assembled to the socket 120, the hooking portion 1121 is aligned with the tank 121 and inserted towards the direction p. The hook 112 will abut the inner wall of the tank 121 while extending into the tank 121 and make the elastic arm 1122 deformed and bent. When the hooking portion 1121 passes through the opening 1221, the elastic arm 1122 will return its position and make the hooking portion 1121 buckles with the plate 122.

Thus, by parametrically designing the ratio of the hook length f of the hooking portion 1121 to the arm length La of the elastic arm 1122, the hook strength of the hook 112 buckled with the plate 122 can be strengthened.

In addition, by parametrically designing the width-length ratio (the ratio of the arm length La to the arm thickness t) of the elastic arm 1122, it can be conducive to the deformation of the elastic arm 1122, and can prevent the elastic arm 1122 from breaking when the inner wall of the tank 121 and the hooking portion 1121 abut.

Furthermore, by parametrically designing the hook length f and the width-length ratio, the hook 112 can be inserted into the tank 121 with good assembly stages, which is conducive to judging whether the assembly is in place.

Figure 7:
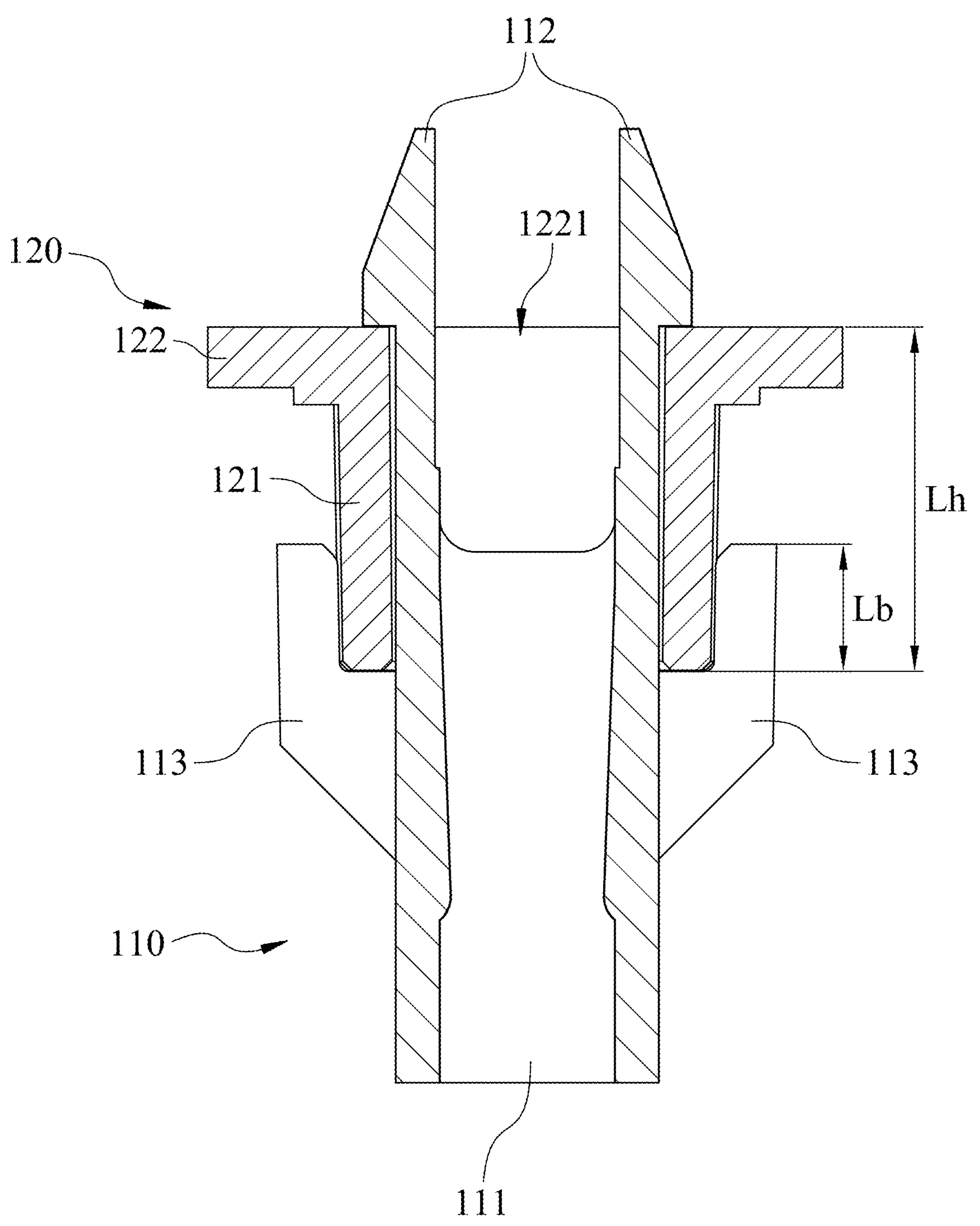
FIG. 7 is a cross-section view of the embedding assembly according to the embodiment of FIG. 1.

Referring to FIG. 1 and FIG. 7. FIG. 7 is a cross-section view of the embedding assembly 100 according to the embodiment of FIG. 1. The socket 120 has a socket length Lh, and the socket length Lh is the sum of the length of the tank 121 and the length of the plate 122. The restricting part 113 has a restrictive length Lb, and the ratio of the socket length Lh to the restrictive length Lb (Lh/Lb) is between 1.50 and 5.00.

Specifically, if the ratio of the socket length Lh to the restrictive length Lb exceeds the above range, the embedding assembly 100 will fall off when it falls. Therefore, by parametrically designing the ratio of the socket length Lh to the restrictive length Lb, the restricting part 113 can be further strengthened to prevent the hook 112 from falling off the plate 122, while increasing the assembly strength of the embedding assembly 100.

Figure 8:
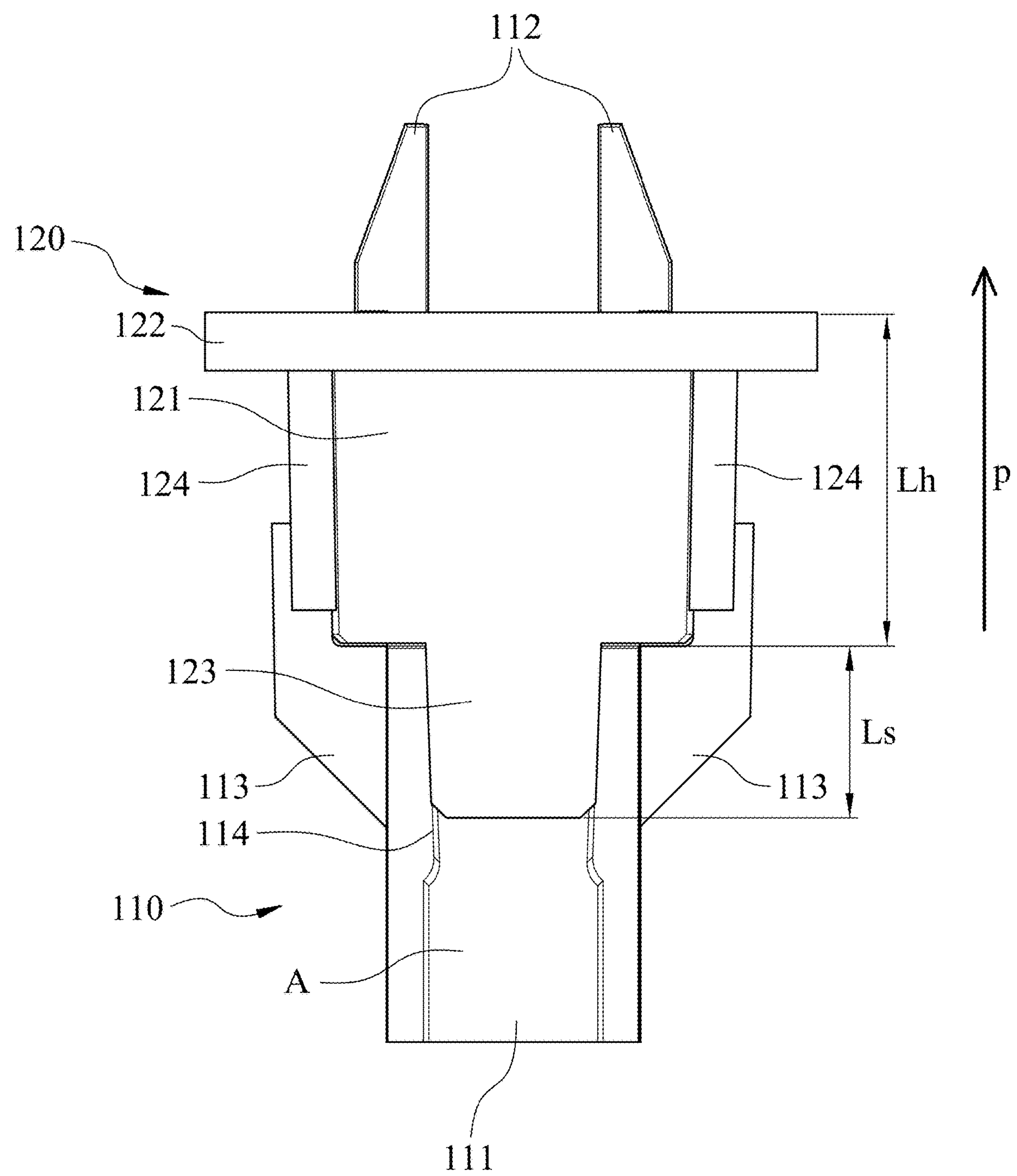
FIG. 8 is a front view of the embedding assembly according to the embodiment of FIG. 1.

Referring to FIG. 1, FIG. 5, and FIG. 8. FIG. 8 is a front view of the embedding assembly 100 according to the embodiment of FIG. 1. A slot 114 is formed by the hook 112 and a surface A of the body 111. The socket 120 further includes a tongue plate 123, and the tongue plate 123 is connected to one end of the tank 121 away from the plate 122 to further prevent the embedding structure 110 from being bent. As shown in FIG. 8, the slot 114 corresponds to the tongue plate 123. When the embedding structure 110 is connected to the socket 120, the tongue plate 123 is inserted into the slot 114. The tongue plate 123 has a tongue length Ls. The ratio of the socket length Lh of the socket 120 to the tongue length Ls is between 0.15 and 2.00.

Specifically, if the ratio of the socket length Lh to the tongue length Ls is beyond the above range, it will not be sufficient to prevent the bending of the embedding structure 110 in a direction vertical to the direction p. Therefore, by parametrically designing the ratio of the socket length Lh to the tongue length Ls, the embedding structure 110 can be further prevented from being bent when it is connected to the socket 120.

Figure 9:
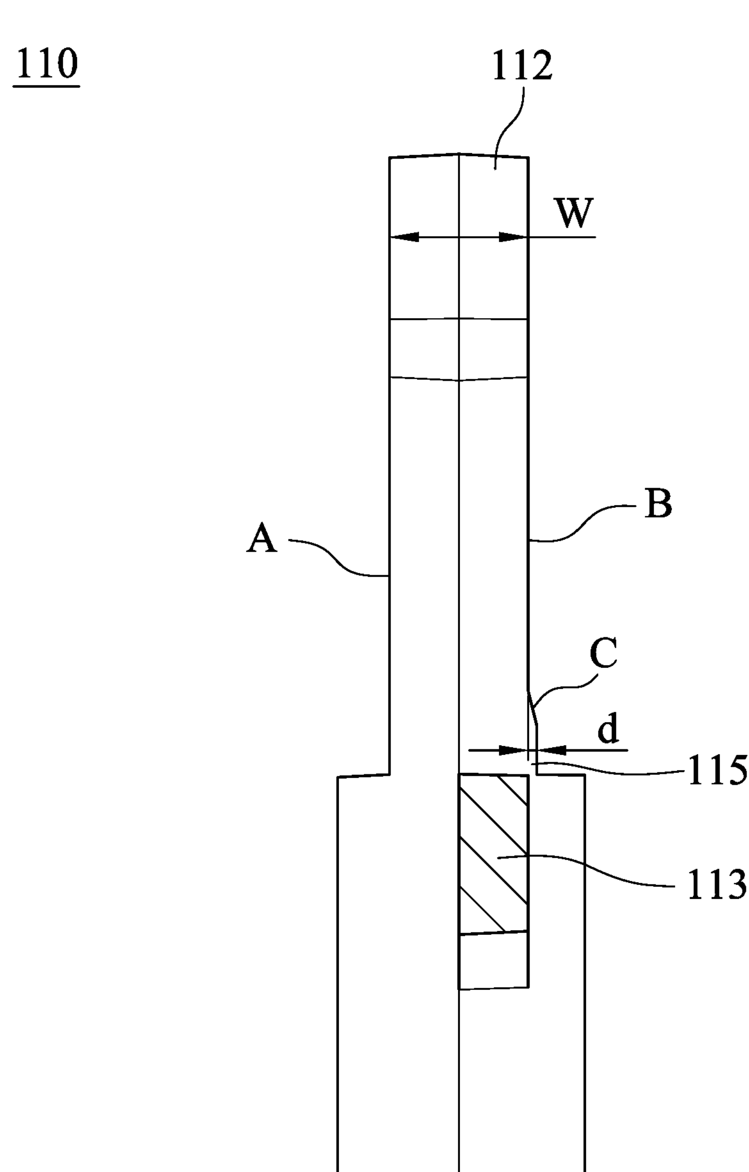
FIG. 9 is a schematic cross-section view of the embedding structure according to the embodiment of FIG. 3.

Referring to FIG. 1, FIG. 3, and FIG. 9. FIG. 9 is a schematic cross-section view of the embedding structure 110 according to the embodiment of FIG. 3. The embedding structure 110 further includes two tight convex portions 115 respectively protruding from the body 111 and being located on another surface B corresponding to the surface A. The tight convex portion 115 includes a guiding surface C, and the guiding surface C is an inclined surface. The tight convex portion 115 is configured to tighten the body 111 of the embedding structure 110 and the tank 121 of the socket 120. The guiding surface C is configured to closely fit the tank 121 and the tight convex portion 115 together. The tight convex portion 115 has a convex thickness d, the hook 112 has a hook width w, and the ratio of the convex thickness d to the hook width w (d/w) is between 0.01 and 0.10.

Figure 10:
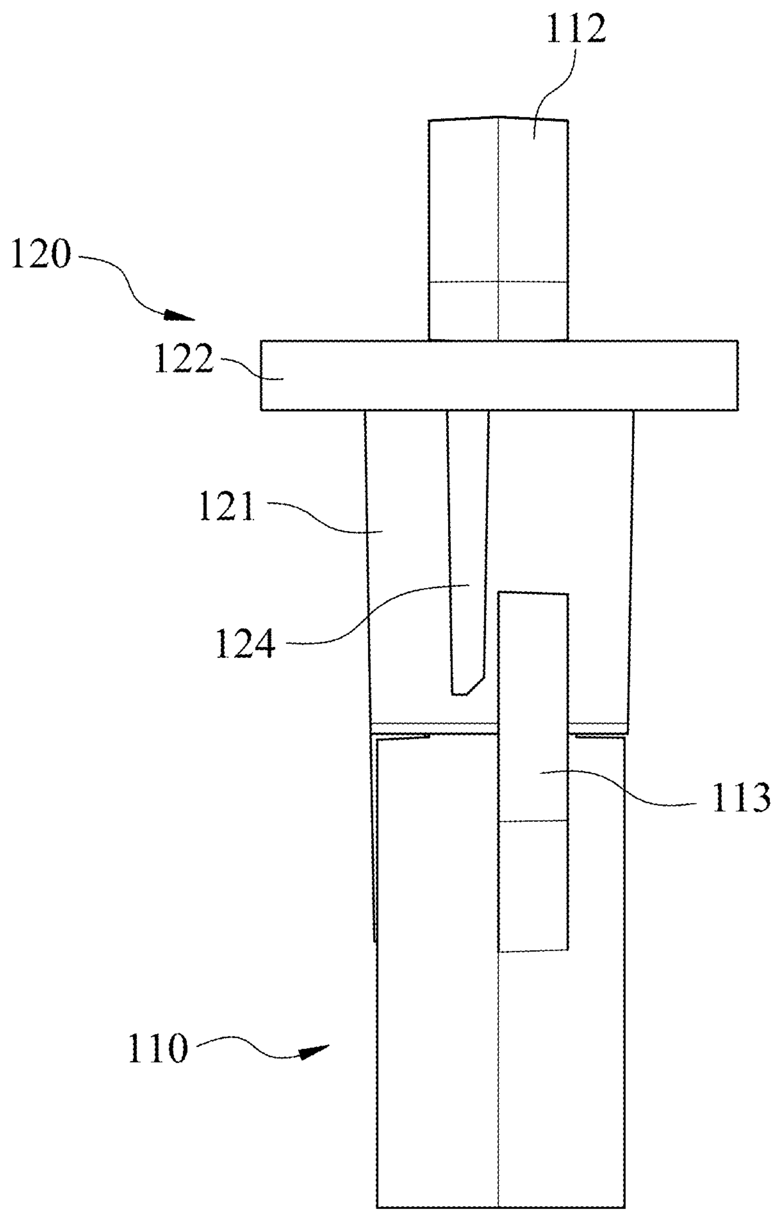
FIG. 10 is a side view of the embedding assembly according to the embodiment of FIG. 1.

Referring to FIG. 1 and FIG. 10. FIG. 10 is a side view of the embedding assembly 100 according to the embodiment of FIG. 1. The socket 120 further includes two fool-proof pieces 124 respectively connected to two sides of the tank 121. When the embedding structure 110 is connected to the socket 120, the fool-proof piece 124 is adjacent to the restricting part 113 and is dislocated with the restricting part 113. Therefore, through the dislocation setting of the fool-proof piece 124 and the restricting part 113, the embedding structure 110 and the socket 120 can be prevented from being assembled in a wrong direction, thereby achieving a directional fool-proof effect.

From the above embodiments, the embedding structure and the embedding assembly provided by the present disclosure have the following advantages:

First, through the buckle of the hook of the embedding structure, not only the embedding structure and the socket can be tightly connected without the use of any fixing components (e.g., screws, backing adhesive, adhesive, or curing glue), but also easy for users to disassemble and recycle, and meets the green design goal.

Second, by parametrically designing the hook length of the hook and the width-length ratio of the embedding structure, the hook strength between the embedding structure and the socket can be enhanced, and the assembly of the embedding structure and the socket is facilitated.

Third, through the restricting parts of the embedding structure and the tongue plate of the socket, when the hook is buckled with the socket, it can prevent the hook from falling off from the socket due to factors of external force such as bending or shaking.

Fourth, through the dislocation setting of the restricting part of the embedding structure and the fool-proof piece of the socket, the embedding structure and the socket can be prevented from being assembled in a wrong direction, thereby achieving a directional fool-proof effect.

The foregoing description of the disclosure has been presented only for the purposes of illustration and description option of the exemplary embodiments and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An embedding structure comprising:

a body;

two hooks disposed on one end of the body and extending in a direction from the body; and two restricting parts respectively connected to two sides of the body and extending in the direction, and a space formed between the two restricting parts and the body respectively and extending along the direction;

wherein the two restricting parts are offset from respective centerlines of the two sides of the body.

2. The embedding structure according to claim 1, wherein a slot is formed by the two hooks and a surface of the body.

3. The embedding structure according to claim 1, further comprising:

two tight convex portions protruding from the body respectively and located on another surface of the body.

4. The embedding structure according to claim 3, wherein the two tight convex portions respectively comprise a guiding surface, and the guiding surface is an inclined surface.

5. The embedding structure according to claim 3, wherein the two tight convex portions respectively have a convex thickness, the two hooks respectively have a hook width, and a ratio of the convex thickness to the hook width is between 0.01 and 0.10.

6. The embedding structure according to claim 1, wherein the two hooks are spaced apart from each other and respectively comprise:

a hooking portion; and an elastic arm connected to the hooking portion and the body.

7. The embedding structure according to claim 6, wherein the elastic arm has an arm length and an arm thickness, and a ratio of the arm length to the arm thickness is a width-length ratio between 3.00 and 8.00.

8. The embedding structure according to claim 7, wherein the hooking portion has a hook length, and a ratio of the hook length to the arm length is between 0.05 and 0.30.

9. The embedding structure according to claim 1, wherein the two restricting parts are respectively in an L-shape, and respectively comprise a restrictive length corresponding to a height of the space.

10. An embedding assembly comprising:

a socket comprising:

a tank; and two fool-proof pieces respectively connected to two sides of the tank; and an embedding structure detachably connected to the socket, comprising:

a body;

two hooks disposed on one end of the body and extending in a direction from the body; and;

two restricting parts respectively connected to two sides of the body and extending in the direction, and a space formed between the two restricting parts and the body respectively and extending along the direction;

wherein the two restricting parts are offset from respective centerlines of the two sides of the body;

wherein when the embedding structure is connected to the socket, the socket is configured for the two hooks to pass through and buckle with one end of the socket, and another end of the socket is embedded in the space and abuts against the two restriction parts, with the tank located between the two restricting parts and the body;

wherein when the embedding structure is connected to the socket, the two fool-proof pieces are adjacent to and dislocated with the two restricting parts respectively.

11. The embedding assembly according to claim 10, wherein the two hooks respectively comprise:

a hooking portion; and an elastic arm connected to the hooking portion and the body;

wherein the elastic arm has an arm length and an arm thickness, and a ratio of the arm length to the arm thickness is a width-length ratio between 3.00 and 8.00.

12. The embedding assembly according to claim 11, wherein the hooking portion has a hook length, and a ratio of the hook length to the arm length is between 0.05 and 0.30.

13. The embedding assembly according to claim 10, wherein the socket comprises:

a plate connected to the tank and comprising an opening communicated with the tank;

wherein when the embedding structure is connected to the socket, the two hooks pass through the tank and the opening and buckled with the plate, and the tank is embedded in the space;

wherein the two restricting parts are respectively in an L-shape, and respectively comprise a restrictive length corresponding to a height of the space.

14. The embedding assembly according to claim 13, wherein the socket has a socket length, and a ratio of the socket length to the restrictive length is between 1.50 and 5.00.

15. The embedding assembly according to claim 13, wherein the socket further comprises a tongue plate connected to one end of the tank away from the plate; and a slot is formed by the two hooks and a surface of the body, and the slot corresponds to the tongue plate;

wherein when the embedding structure is connected to the socket, the tongue plate is inserted into the slot.

16. The embedding assembly according to claim 15, wherein the socket has a socket length, the tongue plate has a tongue length, and a ratio of the socket length to the tongue length is between 0.15 and 2.00.

17. The embedding assembly according to claim 15, wherein the embedding structure further comprises two tight convex portions protruding from the body and located on another surface of the body.

18. The embedding assembly according to claim 17, wherein the two tight convex portions respectively comprise a guiding surface, and the guiding surface is an inclined surface.

19. The embedding assembly according to claim 17, wherein the two tight convex portions respectively have a convex thickness, the two hooks respectively have a hook width, and a ratio of the convex thickness to the hook width is between 0.01 and 0.10.

* * * * *